(12) United States Patent
Shim et al.

(10) Patent No.: US 8,707,044 B2
(45) Date of Patent: Apr. 22, 2014

(54) SYSTEM AND METHOD FOR USING NETWORKED MOBILE DEVICES IN VEHICLES

(75) Inventors: Hyong Shim, Basking Ridge, NJ (US); Stanley Pietrowicz, Freehold, NJ (US); Tao Zhang, Fort Lee, NJ (US); John R. Wullert, II, Martinsville, NJ (US)

(73) Assignee: TTI Inventions D LLC, Wilmington, DE (US)

( * ) Notice: Subject to any disclaimer, the term of this patent is extended or adjusted under 35 U.S.C. 154(b) by 473 days.

(21) Appl. No.: 12/539,286

(22) Filed: Aug. 11, 2009

(65) Prior Publication Data

US 2010/0037057 A1 Feb. 11, 2010

Related U.S. Application Data

(60) Provisional application No. 61/188,564, filed on Aug. 11, 2008.

(51) Int. Cl.
*G06F 21/00* (2013.01)
*G06F 21/60* (2013.01)

(52) U.S. Cl.
CPC .................................. *G06F 21/606* (2013.01)
USPC ........................ 713/171; 701/24; 379/201.05

(58) Field of Classification Search
USPC ......................................................... 726/22
See application file for complete search history.

(56) References Cited

U.S. PATENT DOCUMENTS

| | | | |
|---|---|---|---|
| 6,600,975 B2 | 7/2003 | Moriguchi et al. | |
| 2002/0177928 A1 | 11/2002 | Moriguchi et al. | |
| 2003/0147534 A1* | 8/2003 | Ablay et al. | 380/270 |
| 2004/0203379 A1 | 10/2004 | Witkowski et al. | |
| 2005/0060070 A1* | 3/2005 | Kapolka et al. | 701/29 |
| 2005/0197842 A1* | 9/2005 | Bergmann et al. | 704/270.1 |
| 2006/0106806 A1* | 5/2006 | Sperling et al. | 707/10 |
| 2006/0190097 A1 | 8/2006 | Rubenstein | |
| 2006/0293040 A1 | 12/2006 | Kortge | |
| 2007/0005206 A1 | 1/2007 | Zhang et al. | |

(Continued)

FOREIGN PATENT DOCUMENTS

| | | |
|---|---|---|
| CN | 1388698 | 1/2003 |
| JP | 2001-141475 | 5/2001 |

(Continued)

OTHER PUBLICATIONS

International Search Report dated Oct. 2, 2009, 2 pages.

(Continued)

*Primary Examiner* — Benjamin Lanier

(57) ABSTRACT

A system and method for using networked mobile devices in a vehicle in a tightly integrated manner is presented. The vehicle has an OBE, a mobile device client, and vehicle components, and the mobile device has a mobile device proxy and applications, such that the mobile device client and the mobile device proxy communicate, enabling dynamic transfer of the applications to the OBE and execution of the applications on the mobile device and the OBE using the plurality of vehicle components at runtime. In one embodiment, the mobile device client and the mobile device proxy authenticate each other. The authentication can be performed using digital certificates. The mobile device client can communicate the vehicle components on the vehicle to the mobile device proxy. The mobile device client and the mobile device proxy can communicate using Bluetooth. The vehicle components can include dashboard displays, speakers, and voice I/O systems.

34 Claims, 5 Drawing Sheets

(56) References Cited

U.S. PATENT DOCUMENTS

| | | | |
|---|---|---|---|
| 2007/0063037 A1 | 3/2007 | Silverbrook et al. | |
| 2007/0171049 A1* | 7/2007 | Argasinski | 340/539.13 |
| 2008/0007120 A1* | 1/2008 | Weyl et al. | 307/10.1 |
| 2008/0064360 A1 | 3/2008 | Contour et al. | |
| 2008/0171514 A1 | 7/2008 | Gaborit et al. | |

FOREIGN PATENT DOCUMENTS

| | | |
|---|---|---|
| JP | 2002-323980 | 11/2002 |
| JP | 2004-258754 | 9/2004 |
| JP | 2009-003908 | 1/2009 |
| KR | 20020082052 | 10/2002 |
| KR | 10-2005-0110558 | 4/2007 |

OTHER PUBLICATIONS

International Preliminary Report on Patentability for PCT/US09/53402, completed Oct. 10, 2010.

Written Opinion for PCT/US2009/053402, mailed Oct. 2, 2009.

Elg, J, "Specification of the Bluetooth System," Core, Version 1.1, part C, Link Manager Protocol, 3.1 General Response Messages, 3.2 Authentication, 3.3 Pairing, 3.4 Change Link Key, 3.5 Change Current Key, Dec. 1, 1999, pp. 187-199.

Extended Search Report on European Application 09807161.6, dated Oct. 24, 2011.

* cited by examiner

SYSTEM AND METHOD FOR USING NETWORKED MOBILE DEVICES IN VEHICLES

CROSS REFERENCE TO RELATED APPLICATIONS

The present invention claims the benefit of U.S. provisional patent application 61/188,564 filed Aug. 11, 2008, the entire contents and disclosure of which are incorporated herein by reference as if fully set forth herein.

FIELD OF THE INVENTION

The present invention relates generally to wireless networks.

BACKGROUND OF THE INVENTION

The in-vehicle use of mobile, handheld network devices, e.g., mobile telephones, portable mp3 players, personal digital assistants, etc., has dramatically increased over the past few years. However, it is difficult and even dangerous to use such devices in the car. To interact and control his or her device, the user currently has little choice but to learn a new user interface (UI) system in the car, or resort to using the display and controls on the device, which are often too small and awkward for in-car use and present a serious safety hazard.

In the area of in-vehicle network computing, Ford Sync allows use of voice commands. In some cars, the user can use the car's audio controls to control the media playing of certain portable MP3 players. For example, in Ford Sync, either application programs execute directly on mobile devices or application data is transferred to the vehicle to be used by the vehicle's application programs. Therefore, the user has to learn the vehicle's native UI mechanism.

In the area of general network computing, both Sun's JINI and UPnP allow dynamic discovery of functional capabilities of various components in a given computing environment. In turn, this feature allows a new device that has not been previously known to the computing environment to use the capabilities of the other devices and make its capability available to other devices. In JINI and UPnP, the application interface and/or driver software is moved from the host network to a new device that connects to the network, and the device runs the received software in order to use the services of the host network. In both UPnP and JINI, the user should still employ the UI controls of the mobile device to use the services of vehicle components, which is inconvenient and dangerous.

As a result, there is a growing need to better support vehicle drivers and passengers to seamlessly and intuitively use networked handheld devices in the car.

SUMMARY OF THE INVENTION

A novel method for allowing application services of mobile devices to run on vehicles by way of dynamic capability discovery and application program transfer at runtime is presented. Currently, in-vehicle dashboard screens, speakers, and other components are designed to support in-vehicle applications only. In general, the vehicle is regarded as a closed system that provides a fixed (or static) set of application services and static UI controls. The present invention provides a novel way of "opening up" the vehicle's system so that it can allow a wide variety of third-party applications to use its display and other devices on an as-needed basis, by dynamically moving application software code from mobile devices to the vehicle at runtime. Thus, in the inventive system and method, application software of the mobile device is transferred from the device to the vehicle to run on the vehicle.

An inventive system and method for using networked mobile devices in a vehicle is presented. The vehicle has an in-vehicle computer, generally known in the art as an OBE, a mobile device client, and a plurality of vehicle components, and the mobile device has a mobile device proxy and one or more applications, such that the mobile device client and the mobile device proxy communicate, enabling dynamic transfer of the one or more applications to the OBE and execution of the one or more applications on the mobile device and the OBE using the plurality of vehicle components at runtime. The mobile device client authenticates the mobile device proxy and the mobile device proxy authenticates the mobile device client. The authentication can be performed using digital certificates. The mobile device client communicates the vehicle components on the vehicle to the mobile device proxy. The mobile device client and the mobile device proxy can communicate using Internet Protocol (IP) over Bluetooth. The vehicle components can include dashboard displays with or without user interface (UI) mechanisms, speakers, and voice I/O systems.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

The inventive system and method enables a networked mobile device to engage a vehicle, permitting the device's user to interface with and control the audio, display, user interface (UI) and other systems of the vehicle by way of dynamically discovering such systems on the vehicle and moving application code from the mobile device to the vehicle on demand.

Figure 1:
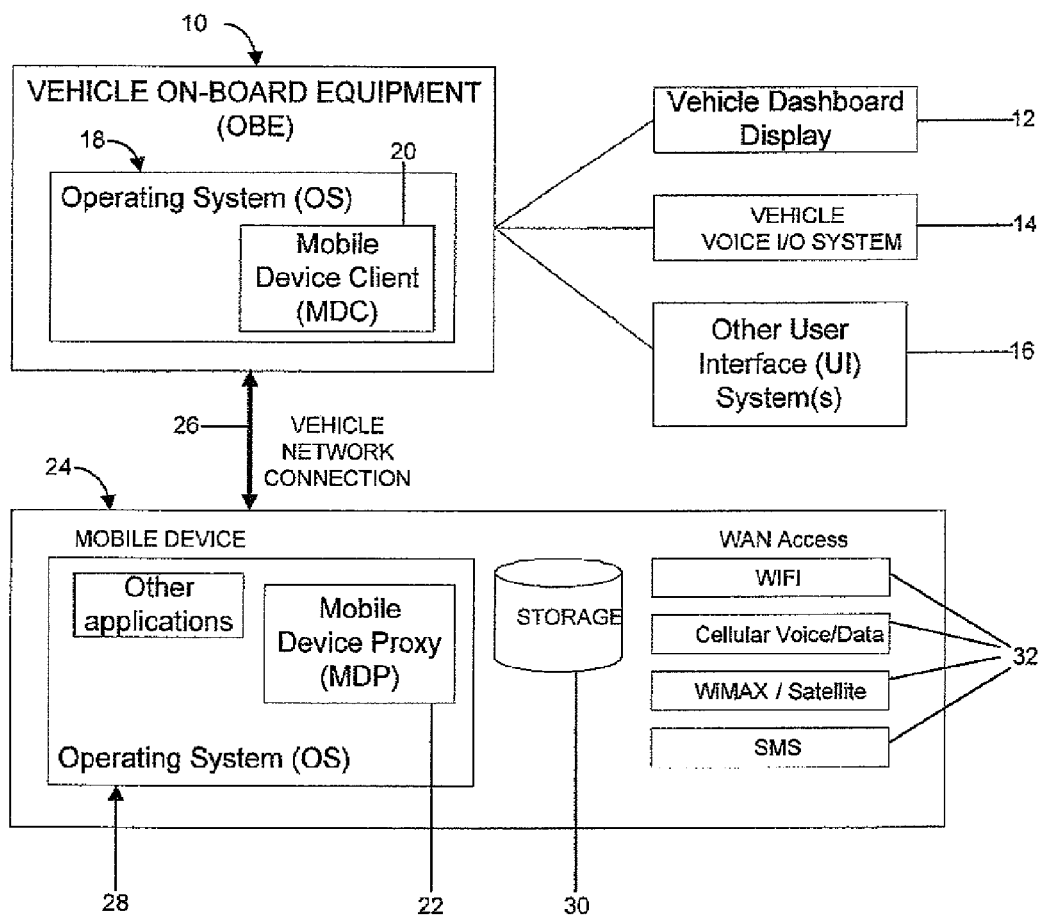
FIG. 1 is an architectural overview of the inventive system.

FIG. 1 presents an architectural overview of the present invention. In FIG. 1, a vehicle is equipped with an in-vehicle system, called On-Board Equipment (OBE) 10. For all the practical purposes of the present invention, the OBE 10 is a computer system specifically built for in-vehicle use. OBE 10 may consist of a vehicle dashboard display system 12, which provides a graphical display area for vehicle applications and touch-screen capabilities for getting input from vehicle occupants. It may also provide a voice input/output (IO) system 14 that allows the user to issue verbal commands to interact with vehicle applications. It may also include one or more other UI system(s) 16, such as soft keys, buttons, for instance on the steering wheel, or other areas of the vehicle, a mouse, a keyboard, and/or an optical device that tracks where the driver is focusing with respect to the vehicle dashboard display 12.

While the OBE 10 in FIG. 1 is shown as a single device, its functions and interfaces may be implemented in a distributed manner on multiple physical devices. Like a general-purpose computer, the OBE 10 runs an operating system 18, such as Linux, that provides a runtime environment for vehicle applications and special software, called drivers, which vehicle applications can use to interact with vehicle IO, audio, and other systems. The concepts of operating systems, drivers, applications, and use of drivers are well understood in the field of the present invention.

As shown in FIG. 1, a special-purpose software, called the Mobile Device Client (MDC) 20, is installed and executes on the OBE 10. As the name implies, the MDC 20 is a client-side application that works with a server-side software of the present invention, called the Mobile Device Proxy (MDP) 22, to tightly integrate the vehicle's OBE 10 and the mobile device 24. The MDC 20 operates to let the MDP 22 know about the vehicle's dashboard display 12, voice I/O 14, and other systems 16 and to move and execute one or more applications from the user's mobile device 24. In one embodiment, the MDC 20 is pre-installed on the OBE 10 of a vehicle when the vehicle is manufactured. However, other methods are also feasible, including a vehicle service station installing the MDC 20 on the OBE 10, for example via an USB interface, upon the customer's request subsequent to vehicle manufacture and purchase.

As shown in FIG. 1, the OBE 10 is capable of communicating with the user's mobile device 24 via a network connection 26. Specifically, the OBE 10 can communicate with the mobile device 24 via a Bluetooth connection, and the MDC 20 on the OBE 10 communicates with the MDP 22 on the mobile device 24 using a TCP/IP connection over Bluetooth. Implementing applications that use TCP/IP over Bluetooth is well-understood in the field of this invention. Other wireless technologies may also be used to interconnect the OBE 10 and the mobile device 24. Other transport layer protocols beyond TCP, such as UDP, may be also used for the MDP 22 and MDC 20 to communicate with each other.

In FIG. 1, the user's mobile device 24 consists of the operating system (OS) 28, storage device 30, and a number of wireless communications capabilities 32. As discussed above, the mobile device 24 runs a special-purpose application, called the Mobile Device Proxy (MDP) 22, which works with the MDC 20 on the OBE 10 to run the applications from the mobile device 24 on the OBE 10 of the vehicle by means of dynamic discovery of the vehicle's capabilities and dynamic transfer of application code from the mobile device 24 to the vehicle OBE 10.

The inventive methods of using special-purpose applications, i.e., MDC 20 and MDP 22, on the vehicle and mobile device 24, respectively, to communicate vehicle system information to the mobile device 24 and move application code from the mobile device 24 to the vehicle to execute thereon are unique in the field of mobile computing in a vehicle environment. Advantageously, in the present invention, all the applications on the mobile device 24 can be available to run on the vehicle (assuming that the vehicle provides necessary device drivers that the applications need), while in prior art approaches, the user is limited to only those applications provided by the vehicle. For example, in other approaches, if the user has an application, e.g., APP-A, on the mobile device 24, but the vehicle does not have a functionally-similar application that can process APP-A's data and/or provide appropriate drivers for APP-A, the user cannot use APP-A on the vehicle. However, the present invention allows the user to use APP-A on such a vehicle by moving the executable application code and/or data of APP-A from the mobile device 24 to the vehicle, and executing the code with the data thereon. Note in this example that APP-A is provided by the mobile device manufacturer. Therefore, when running on the vehicle, APP-A can provide a similar look-and-feel to when it runs on the mobile device 24, which can dramatically reduce the learning curve of the user for using APP-A on the vehicle.

Figure 2:
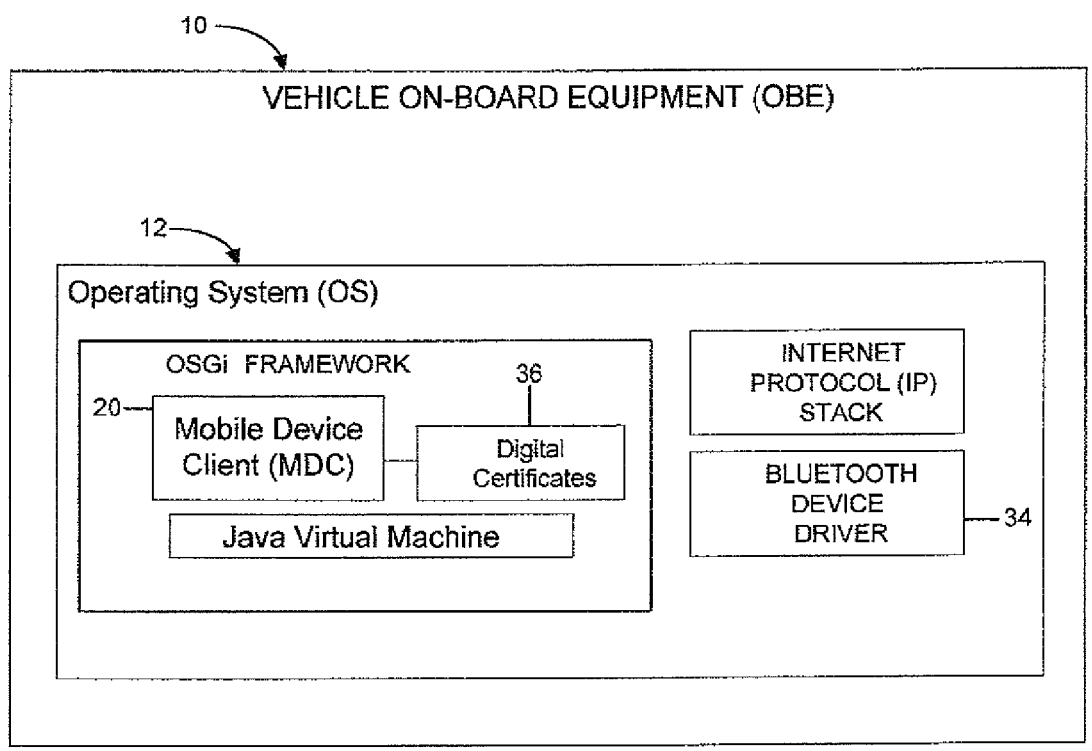
FIG. 2 is a schematic of vehicle on-board equipment in an embodiment of the inventive system.

FIG. 2 illustrates the MDC 20 implemented on the OBE 10 in an embodiment of the present invention. In FIG. 2, the OBE 10 provides an application runtime environment, called the OSGi Framework. OSGi Framework is an industry standard technology for executing and managing the lifecycle of a particular type of Java applications, called OSGi Bundles. The OSGi Framework and Bundles have been used to implement a variety of vehicle applications for the OBE by the Vehicle Infrastructure Integration Consortium (also called IntelliDrive). The concepts of the OSGi Framework and Bundles are well understood by those who practice in the field of the present invention.

As shown in FIG. 2, the MDC 20 is implemented as an OSGi Bundle in the preferred embodiment of the present invention. This way, the MDC 20 can take advantage of the default system services provided by the OSGi Framework to realize its functions, including discovering (Java) application packages and services exported by other OSGi Bundles on the OSGi Framework. For example, one of the standard services available on every OSGi Framework is the Device Access service, which allows other applications to programmatically discover the devices and the corresponding drivers available on the OSGi Framework and bind them to use the discovered devices in their operations. Therefore, the MDC 20 can use the OSGi Device Access service to keep track of available devices and drivers on the vehicle at runtime. Likewise, the MDC 20 can also use the OSGi Service Registry, which is another standard service on every OSGi Framework, to keep track of services and application packages exported by other Bundles on the OSGi Framework.

As an OSGi Bundle, the MDC 20 also has the ability to dynamically install, start, and stop other Bundles at runtime by means of the application programming interfaces (APIs) of OSGi BundleContext and Bundle objects. Specifically, upon receiving an application bundle from the MDP 22, described below, the MDC 20 first stores the received Bundle in the file system of the vehicle OBE 10. To install the received Bundle on the vehicle, the MDC 20 then uses the installBundle( ) method of the BundleContext object provided by the vehicle's OSGi Framework; it passes the URL to the location of the received Bundle on the file system to installBundle( ). Subsequently, it invokes the start( ) method on the Bundle object that is returned by installBundle( ) to start the newly installed Bundle. Likewise, the MDC 20 can use the stop( ), update( ), and uninstall( ) methods of the same Bundle object to stop the operation of, update the software of, and uninstall the received Bundle, respectively.

Figure 3:
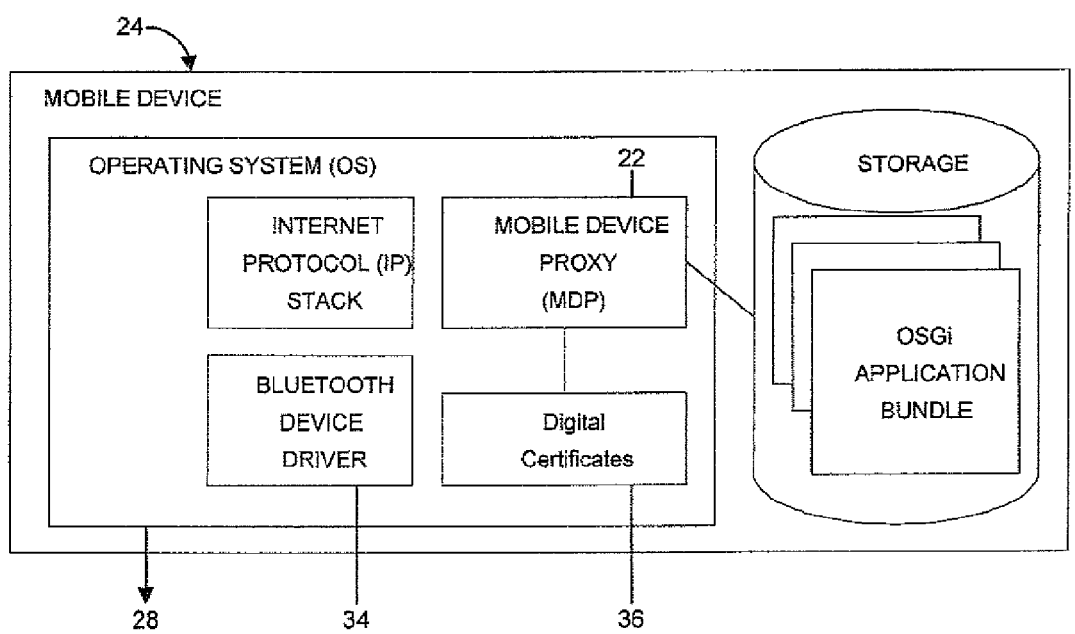
FIG. 3 is a schematic of a mobile device in an embodiment of the inventive system.

In FIG. 3, the MDP 22 is shown as an application that runs in the operating system (OS) 28 of the mobile device 24. Unlike the MDC 20, which is an OSGi Bundle (in Java), the MDP 22 is an native application which is specifically implemented to run in the OS 28 of the mobile device 24. As shown in FIG. 3, the MDP 22 manages a set of OSGi Bundles that can be sent to the vehicle OBE 10 and can execute there. For each OSGi Bundle, the MDP 22 keeps track of dependencies the OSGi Bundle may have on other applications. In one embodiment, the dependency includes the names of packages (in Java) the OSGi uses in its operation. It may also include version information for each dependent package. MDP 22 uses the dependency information to determine if a given OSGi Bundle stored in storage 30 on the mobile device 24 can run on the vehicle OBE 10.

In the embodiment in FIG. 2 and FIG. 3, the MDC 20 and MDP 22 use the TCP/IP over Bluetooth 34 to communicate with the MDP 22 on the mobile device 24. Specifically, the MDC 20 periodically broadcasts a "Hello" message to a well-known port number, to which the MDP 22 listens for MDC 20 messages. Upon receiving the message from the MDC 20, the MDP 22 responds by sending its own "Hello" message to another well-known port number, to which the MDC 20 listens for MDP 22 messages. This response message from the MDP 22 to the MDC 20 is addressed to the IP address that the MDP 22 retrieves from the IP header of MDC's broadcast message. The response message also includes a port number, to which the MDP 22 listens for further communications with the MDC 20, and an identifier, which uniquely identifies the MDP's mobile device 24. UDP can be used both for the broadcast messages from the MDC 20 to the MDP 22 and for the response message from the MDP 22 to the MDC 20. Alternatively, TCP, or other appropriate communication techniques, can be used for communicating these messages between the MDC 20 and MDP 22.

FIG. 2 and FIG. 3 show both the MDC 20 and MDP 22 having asymmetric cryptographic keys and their digital certificates 36, which are used to perform mutual authentication and secure the communication, as described in the present disclosure, between the MDC 20 and MDP 22. The mechanisms for installing, distributing, updating, and revoking digital certificates 36 are well understood in the field of the present invention. In one embodiment of the present invention, the MDC 20 digitally signs its "Hello" broadcast message, which allows the MDP 22 to validate the signature of the received the "Hello" message and authenticate the MDC 20. Likewise, the MDP 22 digitally signs its "Hello" response message, which allows the MDC 20 to validate the signature of the received "Hello" response message and authenticate the MDP 22. The algorithms for signing messages and verifying signatures with digital signatures are well-known in the field of the present invention. Data used for creation, exchange, or use of symmetric cryptographic encryption and integrity protection of transfer of application code and data can also be communicated between the MDC 20 and MDP 22 by way of having the MDC 20 and MDP 22 run TLS, DTLS, or shared key management protocols. TLS and DTLS are industry standard communications protocols for establishing and transferring data in secure sessions and are well understood in the field of the present invention.

Operation of the inventive system is now described. The MDC 20 executes to send a list of vehicle capabilities, in terms of application packages exported by OSGi Bundles on the vehicle, and to receive and run OSGi Bundles from the MDP 22 on the mobile device 24. Once the MDC 20 detects the MDP 22, as described above, the MDC 20 attempts to determine if the detected MDP 22 is legitimate, that is MDC 20 performs authentication regarding MDP 22. In one embodiment, the MDP 22 can digitally sign its "Hello" response message to the MDC 20, which, in turn, validates the signature before proceeding.

If the MDC 20 successfully authenticates the MDP 22, MDC 20 sends to the MDP 22 the list of vehicle capabilities, such as application packages and services exported by the OSGi Bundles on the vehicle OBE 10. The list is contained in a message, called "CAP", addressed to the IP address that the MDC 20 retrieves from the IP header of the MDP "Hello" response message and the port number included in the same "Hello" response message. The "CAP" message also includes the port number, to which the MDC 20 listens for potential file transfer of OSGi Bundles from the MDP 22, and the location information on the file system of the OBE 10 where the OSGi Bundles are to be stored.

A File Transfer Protocol, e.g., FTP or secure FTP, can be used to transfer any OSGi Bundle files from the mobile device 24 to the vehicle, in which the MDC 20 plays the role of an FTP server and the MDP 22 the role of an FTP client. Other approaches are also feasible, including a well-known file transfer over Secure Shell (SSH), HTTP, or HTTPS, which uses the Transport Layer Security. UDP transfers can also be supported using Datagram Transport Layer Security.

After sending the "CAP" message, the MDC 20 waits to receive an acknowledgement message from the MDP 22 that it has received the "CAP" message. If the acknowledgement is received within a (configurable) period of wait time, the MDC 20 proceeds to listen for a FTP connection request from the MDP 22 at the port number included in the "CAP" message. Otherwise, the MDC 20 sends the "CAP" message again and waits for the acknowledgement. If the MDC 20 still does not receive the acknowledgement after a (configurable) number of retries, MDC 20 proceeds to wait for the current mobile device 24 to disconnect from the vehicle, the process of which is described below.

When the MDC 20 receives an FTP connection request from the MDP 22 within a (configurable) period of wait time, MDC 20 proceeds to execute the FTP protocol with the MDP 22 to receive application programs, that is, OSGi Bundles, from the mobile device 24. Subsequent to the successful transfer of the OSGi Bundles, the MDC 20 stores them on the file system of the vehicle OBE 10 and installs and starts them on the OSGi Framework of the vehicle. If the FTP transfer fails, the MDC 20 retries the process of waiting for FTP connection requests from the MDP 22 and executing the FTP protocol. If the FTP transfer still fails after a (configurable) number of retries, MDC 20 proceeds to wait for the current mobile device 24 to disconnect from the vehicle.

It may happen that the MDC 20 does not receive any OSGi bundles after a (configurable) number of retries to wait for FTP connection requests from the MDP 22. In such a case, MDC 20 assumes that the present mobile device 24 does not have any applications to run on the vehicle and waits for the mobile device 24 to disconnect from the vehicle. The MDP 22 can also send the MDC 20 a message indicating that no applications are available.

MDC 20 detects the disconnect of the mobile device 24 by periodically sending "Still There" messages to the same port number used for the "Hello" message broadcast. If MDP 22 does not respond with the corresponding "Still Here" messages within a (configurable) period of time for a (configurable) number of retries, the MDC 20 decides that the mobile device 24 has been disconnected from the vehicle. In such a case, the MDC 20 stops any running OSGi Bundles that have been received from the mobile device 24 and goes back to waiting for new MDPs.

Figure 4:
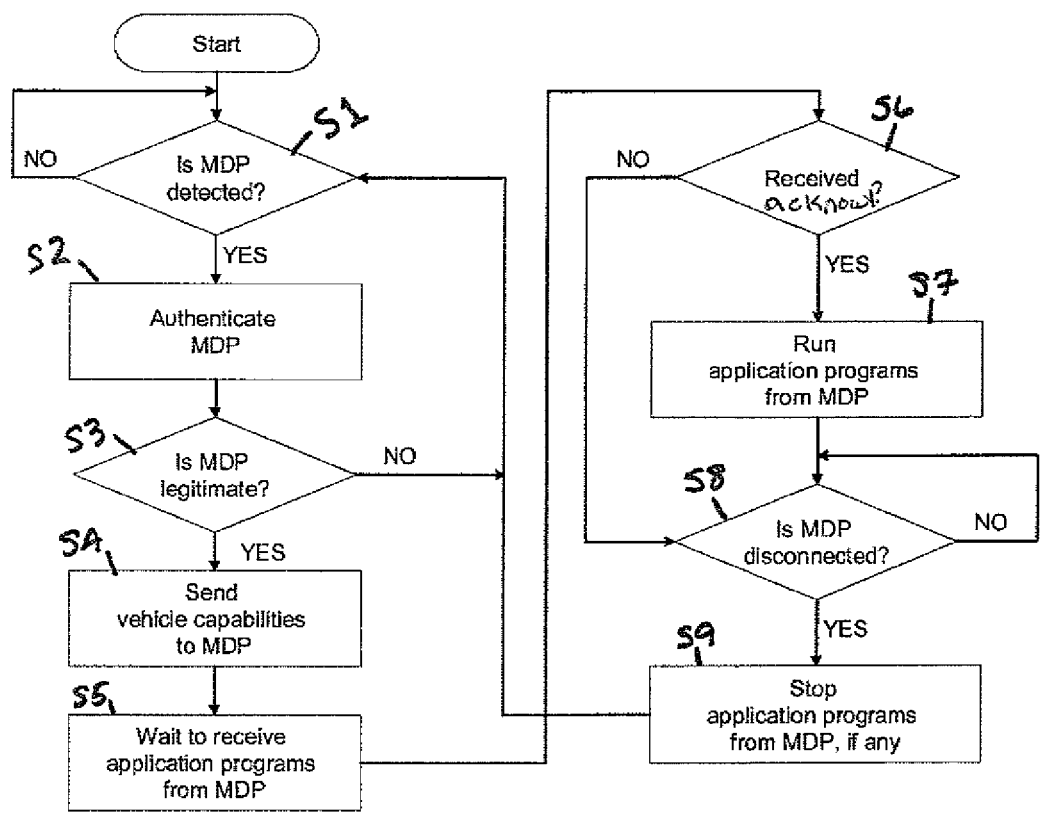
FIG. 4 is flow diagram for transferring vehicle capabilities.

FIG. 4 is a flow diagram of the algorithm that the MDC 20 executes to send the list of vehicle capabilities and to receive and process OSGi Bundles from the MDP 22 on the mobile device 24. In step S1, MDC 20 determines whether MDP 22 is detected. If no MDP 22 is detected (S1=NO), MDC 20 continues to try to detect MDP 22, repeating step S1.

If MDP 22 is detected (S1=YES), in step S2, MDP 22 is authenticated, as discussed above. If MDP is not authentic or legitimate (S3=NO), then processing returns to step S1.

If MDP 22 is legitimate (S3=YES), in step S4 MDC 20 sends vehicle capabilities to this legitimate MDP 22. MDC 20 waits to receive application programs from MDP 22 in step S5. In step S6, MDC 20 checks for acknowledgement of a "CAP" message. If the message is acknowledged (S6=YES), MDC 20 receives and runs the application programs from MDP 22 in step S7. When the programs are run (in S7) or when no acknowledgement is received (S6=NO), MDC 20 determines whether MDP 22 is disconnected in step S8. If MDP 22 is disconnected (S8=YES), programs from MDP 22 are stopped in step S9. If MDP is not disconnected (S8=NO), MDC 20 continues to check whether MDP 22 is disconnected in step S8.

Operation of the MDP 22 on the mobile device 24, which runs to transfer applications to the MDC 20 on the vehicle, is as follows. Upon receiving the "Hello" message from the MDC 20, the MDP 22 validates the signature on the message to authenticate the MDC 20. If successful, MDP 22 sends its "Hello" response message as described previously.

Subsequently, MDP 22 waits for the "CAP" message from the MDC 20. If the message is not received for a (configurable) period of wait time after a (configurable) time of retries, the MDP 22 goes back to waiting for and processing the "Hello" messages. Otherwise, the MDP 22 sends an acknowledgement for the receipt of the "CAP" message, retrieves the list of application packages and services from the received "CAP" message, and tries to identify OSGi Bundles that can execute on the information, if applicable, of the application packages and services available on the vehicle.

If an OSGi Bundle for an application that can run on the vehicle exists, the MDP 22 prepares to send the Bundle to the MDC 20. Such preparation includes configuring and running some associated components of the application on the mobile device 24. For example, a text messaging application may exist on a mobile phone 24 whose OSGi Bundle consists of a software component designed to use the vehicle's voice recognition system to allow the user to verbally dictate text messages for a given recipient and a graphical user interface (GUI) component to display text messages being composed on the vehicle's dashboard display. When the user says "Send Message," yet another component of the text messaging Bundle sends the composed message and the recipient information to the mobile device 24, e.g., on the IP over Bluetooth connection 34, which, in turn, sends the message out to the recipient using the message transmission mechanism of the mobile device 24.

This type of an application requires that some application components run on the mobile device 24 at the same time as the components execute on the vehicle. In the above example of the described text messaging application, some application components should run on the mobile device 24 that receive the composed messages from the vehicle and send the messages to recipients. To support this type of an application, the MDP 22 maintains a configuration file which identifies, for each OSGi Bundle, the corresponding application components and any configuration and initialization data for them. If an OSGi Bundle can execute on the vehicle, the MDP 22 first configures and runs the corresponding application components on the mobile device 24 and then transfers the OSGi Bundle to the MDC 20.

Once all the OSGi Bundles have been transferred to the MDC 20, the MDP 22 waits until the mobile device 24 is disconnected from the vehicle. It does so by listening for and responding to the "Still There" messages from the MDC 20. When disconnected, the MDP 22 stops all the application components that have been running in support of the OSGi Bundles that have been transferred to the vehicle and goes back to waiting for the "Hello" message from the MDC 20.

Figure 5:
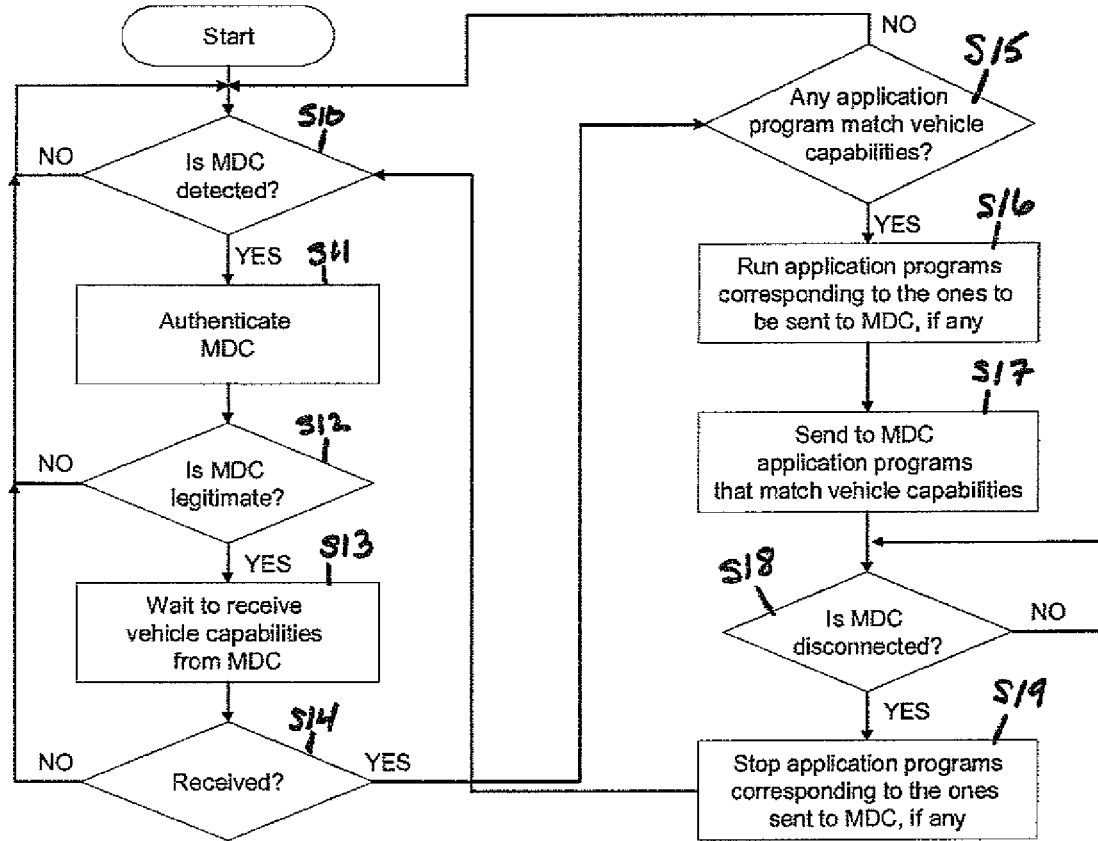
FIG. 5 is a flow diagram for transferring application programs.

FIG. 5 is a flow diagram of the algorithm the MDP 22 on the mobile device 24 runs to transfer applications to the MDC 20 on the vehicle. In step S10, MDP 22 determines whether MDC 20 is detected, that is, whether a "Hello" message has been received. If no MDC 20 is detected (S10=NO), MDP 22 continues to listen for a message, repeating step S10.

If MDC 20 is detected (S10=YES), it is authenticated in step S11 using the procedure described above. If the detected MDC 20 is legitimate (S12=YES), then MDP 22 waits to receive vehicle capabilities from MDC 20 in step S13. Otherwise, if MDC 20 is not legitimate (S12=NO), MDP 22 returns to step S10 and listens to detect another "Hello" message.

In step S14, MDP 22 determines whether the vehicle capabilities have been received from the MDC 20. If the vehicle capabilities have not been received (S14=NO), processing returns to step S10 and MDP 22 listens for another "Hello" message.

If vehicle capabilities have been received (S14=YES), MDP 22 determines whether any application programs match these vehicle capabilities, in step S15. If not, processing returns to step S10 and MDP 22 listens for another "Hello" message.

If there are one or more application programs that match vehicle capabilities (S15=YES), then, in step S16, MDP 22 runs any application programs that correspond to those being sent to MDC 20. In step S17, MDP 22 sends to MDC 20 any application programs that match vehicle capabilities.

In step S18, MDP 22 determines whether MDC 20 is disconnected. If MDC 20 is not disconnected (S18=NO), MDP 22 continues to check whether MDC 20 is disconnected by repeating step S18. If MDP 22 determines that MDC 20 is disconnected (S18=YES), application programs in MDP 22 corresponding to those in MDC 20 are stopped in step S19.

Several extensions on the described method are possible. For example, the communication between the MDC 20 and MDP 22 can be secured by employing an industry-standard secure transport protocol such as TLS or DTLS as previously mentioned. In addition, the MDC 20 can communicate with multiple mobile devices 24 at the same time. This is feasible by keeping track of the IP address of each mobile device 24 and the associated identifier information in the "Hello" response message from the MDP 22.

To facilitate faster MDP 22 and MDC 20 interactions after the initial encounter and download of applications between the vehicle and mobile device, the MDC 20 may keep a cache of applications on the OBE 10. The OSGi Framework allows Java applications to reside in the framework without starting, for instance, between vehicle uses. During the next interaction between the MDP 22 and MDC 20, such as the next time the driver enters the vehicle, the MDC 20 will send the MDP 22, in the "Hello" response message, a list of available applications associated with that mobile device 24 that are already in the OBE 10. The MDC 20 can use the MDP's digital certificate 36 to identify the mobile device 24 and associate applications with it.

The list of available applications sent to the MDP 22 can also include information to identify the application version. If the application that the mobile device 24 wishes to run is already installed on the OBE 10, but not running, the MDP 22 need only identify which application the MDC 20 should start and avoid an unnecessary download. It can do so by sending a "START" message to the MDC 20 identifying a list of applications to start after running any corresponding application components on the mobile device 24 as previously described. Receipt of the "START" message will cancel the MDC 20 wait for an FTP connection request from the MDP 22.

If the MDP 22 determines that the MDC's application is out of date based on the application version, MDP 22 will connect via FTP and transfer the new application with instructions to perform an OSGi Update of the application's Bundle. In the interactions above and previously described, each application is signed, which helps the MDC 20 to establish authenticity and determine if any alterations of the application have occurred during the download process.

Further, the described interactions between the MDC 20 and MDP 22 can occur anytime the mobile device 24 is within the radio range of the vehicle whether the vehicle has not started, is starting up, or has started. In the preferred embodiment of the invention, the vehicle has a wireless key device, and the MDC 20 begins to listen for MDPs and responds only after the vehicle has successfully authenticated a user who has the wireless key device. This can be achieved if the vehicle provides a service on the OSGi Framework that publishes the vehicle lock and unlock status to other applications on the same OSGi Framework, and the MDC 20 subscribes to the service.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method comprising:
    transmitting information regarding capabilities of a computing system of a vehicle to a mobile device;
    receiving at least a first portion of an application from the mobile device if it is determined that the application matches the capabilities of the computing system of the vehicle; and
    executing at least the first portion of the application with the computing system of the vehicle, wherein execution of the application includes execution of at least the first portion of the application by the computing system of the vehicle and execution of at least a second portion of the application by the mobile device.

2. The method of claim 1, further comprising authenticating, with a mobile device client of the computing system of the vehicle, a mobile device proxy on the mobile device.

3. The method of claim 2, wherein the mobile device client and the mobile device proxy communicate using at least one of a Bluetooth connection, an Internet Protocol (IP) connection, and a secure connection.

4. The method of claim 1, further comprising communicating with a mobile device proxy on the mobile device to dynamically create cryptographic keys for at least one of encryption, integrity protection, or other security protection of communications between the vehicle and the mobile device.

5. The method of claim 1, wherein communication between the mobile device and the vehicle occurs while the vehicle is not running.

6. The method of claim 1, wherein communication between the mobile device and the vehicle occurs while the vehicle is being started.

7. The method of claim 1, wherein the application comprises a text messaging application.

8. The method of claim 7, wherein executing the application comprises:
    receiving, by the vehicle, a verbal message;
    converting the verbal message into a text message; and
    providing the text message to the mobile device for transmission to a recipient.

9. A system comprising:
    a transmitter configured to transmit information regarding capabilities of a computing system of a vehicle to a mobile device;
    a receiver configured to receive at least a first portion of an application from the mobile device if it is determined that the application matches the capabilities of the computing system of the vehicle; and
    a processor operatively coupled to the transmitter and the receiver and configured to execute at least the first portion of the application, wherein execution of the application includes execution of at least the first portion of the application by the computing system of the vehicle and execution of at least a second portion of the application by the mobile device.

10. The system of claim 9, wherein the processor is further configured to authenticate a mobile device proxy on the mobile device.

11. The system of claim 9, wherein the processor is further configured to dynamically create cryptographic keys for at least one of encryption, integrity protection, or other security protection of communications between the vehicle and the mobile device.

12. The system of claim 9, wherein communication between the mobile device and the vehicle occurs while the vehicle is not running.

13. The system of claim 9, wherein communication between the mobile device and the vehicle occurs while the vehicle is being started.

14. The system of claim 9, further comprising a memory configured to store at least the portion of the application at the vehicle.

15. The system of claim 9, wherein the application comprises a text messaging application.

16. The system of claim 15, wherein:
the processor is configured to convert a received verbal message into a text message; and
the transmitter is configured to provide the text message to the mobile device for transmission to a recipient.

17. A method comprising:
receiving, at a mobile device, information regarding capabilities of a computing system of a vehicle;
determining whether an application matches the capabilities of the computing system of the vehicle; and
providing at least a first portion of the application to the vehicle for execution by the computing system of the vehicle if the application matches the capabilities of the computing system of the vehicle, wherein execution of the application includes execution of at least the first portion of the application by the computing system of the vehicle and execution of at least a second portion of the application by the mobile device.

18. The method of claim 17, further comprising authenticating the vehicle with a mobile device proxy on the mobile device.

19. The method of claim 17, wherein the mobile device and the vehicle communicate using at least one of a Bluetooth connection, an Internet Protocol (IP) connection, and a secure connection.

20. The method of claim 17, further comprising using cryptographic keys for at least one of encryption, integrity protection, or other security protection of communications between the vehicle and the mobile device.

21. The method of claim 17, wherein communication between the mobile device and the vehicle occurs while the vehicle is not running.

22. The method of claim 17, wherein communication between the mobile device and the vehicle occurs while the vehicle is being started.

23. The method of claim 17, wherein the application comprises a text messaging application.

24. The method of claim 23, further comprising:
receiving a text message from the vehicle, wherein the text message is based on a verbal message received at the vehicle; and
transmitting the text message to a recipient.

25. An apparatus comprising:
a receiver configured to receive information regarding capabilities of a computing system of a vehicle;
a processor operatively coupled to the receiver and configured to determine whether an application matches the capabilities of the computing system of the vehicle; and
a transmitter operatively coupled to the processor and configured to provide at least a first portion of the application to the vehicle for execution by the computing system of the vehicle if the application matches the capabilities of the computing system of the vehicle, wherein execution of the application includes execution of at least the first portion of the application by the computing system of the vehicle and execution of at least a second portion of the application by the mobile device.

26. The apparatus of claim 25, wherein the processor is further configured to authenticate the vehicle with a mobile device proxy on the mobile device.

27. The apparatus of claim 25, wherein the application comprises a text messaging application.

28. The apparatus of claim 27, wherein:
the receiver is configured to receive a text message from the vehicle, wherein the text message is based on a verbal message received at the vehicle; and
the transmitter is configured to transmit the text message to a recipient.

29. A non-transitory computer-readable medium having instructions stored thereon, the instructions comprising:
instructions to transmit information regarding capabilities of a computing system of a vehicle to a mobile device;
instructions to receive at least a first portion of an application from the mobile device if it is determined that the application matches the capabilities of the computing system of the vehicle; and
instructions to execute at least the first portion of the application with the computing system of the vehicle, wherein execution of the application includes execution of at least the first portion of the application by the computing system of the vehicle and execution of at least a second portion of the application by the mobile device.

30. The non-transitory computer-readable medium of claim 29, wherein the application comprises a text messaging application, and further comprising:
instructions to receive a verbal message;
instructions to convert the verbal message into a text message; and
instructions to provide the text message to the mobile device for transmission to a recipient.

31. A non-transitory computer-readable medium having instructions stored thereon, the instructions comprising:
instructions to receive, at a mobile device, information regarding capabilities of a computing system of a vehicle;
instructions to determine whether an application matches the capabilities of the computing system of the vehicle; and
instructions to provide at least a first portion of the application to the vehicle for execution by the computing system of the vehicle if it is determined that the application matches the capabilities of the computing system of the vehicle, wherein execution of the application includes execution of at least the first portion of the application by the computing system of the vehicle and execution of at least a second portion of the application by the mobile device.

32. The non-transitory computer-readable medium of claim 31, further comprising instructions to authenticate the vehicle with a mobile device proxy on the mobile device.

33. The method of claim 1, further comprising the steps of:
establishing a communication connection with the mobile device;
detecting a disconnection of the communication connection; and
ceasing execution of at least the first portion of the application in response to detecting the disconnection.

34. The method of claim 1, wherein executing the first portion of the application includes communication between the computing system of the vehicle and the mobile device.

* * * * *

UNITED STATES PATENT AND TRADEMARK OFFICE
CERTIFICATE OF CORRECTION

PATENT NO.        : 8,707,044 B2
APPLICATION NO.   : 12/539286
DATED             : April 22, 2014
INVENTOR(S)       : Shim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 605 days.

Signed and Sealed this
Thirtieth Day of June, 2015

Michelle K. Lee
*Director of the United States Patent and Trademark Office*